US 6,993,019 B2

(12) United States Patent
Lee

(10) Patent No.: US 6,993,019 B2
(45) Date of Patent: Jan. 31, 2006

(54) METHOD FOR MAPPING TRANSLATION TYPE IN NO. 7 GATEWAY SIGNALING NETWORK

(75) Inventor: Seong Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 852 days.

(21) Appl. No.: 09/736,366

(22) Filed: Dec. 15, 2000

(65) Prior Publication Data
US 2001/0008532 A1 Jul. 19, 2001

(30) Foreign Application Priority Data
Dec. 16, 1999 (KR) ................ 1999-58315

(51) Int. Cl.
H04L 12/50 (2006.01)
(52) U.S. Cl. ............. 370/385; 370/467; 370/522; 370/401; 379/230
(58) Field of Classification Search ........... 370/401, 370/524, 466–467, 522, 385, 384; 379/229–230
See application file for complete search history.

(56) References Cited

U.S. PATENT DOCUMENTS

| 5,282,244 A | * | 1/1994 | Fuller et al. ................ 379/230 |
| 5,852,660 A | * | 12/1998 | Lindquist et al. ........... 379/230 |
| 5,940,492 A | * | 8/1999 | Galloway et al. ........... 379/230 |
| 6,094,578 A | * | 7/2000 | Purcell et al. ........... 455/426.1 |

* cited by examiner

Primary Examiner—Ricky Ngo
Assistant Examiner—Nittaya Juntima
(74) Attorney, Agent, or Firm—Fleshner & Kim, LLP

(57) ABSTRACT

A method for performing the translation type mapping in the No. 7 gateway signaling network includes defining translation type information on a non-local signaling network in a translation type mapping table according to a manager's request; mapping a translation type of the non-local signaling network contained in the SCCP message received by the neighboring (adjacent) non-local signaling network by searching the translation type mapping table; and mapping a translation type of a local signaling network contained in the SCCP message transmitted to the adjacent non-local signaling network into the translation type of the non-local signaling network by searching the translation type mapping table.

15 Claims, 4 Drawing Sheets

METHOD FOR MAPPING TRANSLATION TYPE IN NO. 7 GATEWAY SIGNALING NETWORK

BACKGROUND OF THE INVENTION

1. Field of the Invention

The present invention relates to a method for mapping a translation type in a No. 7 gateway signaling network, and in particular, to a method for mapping a translation type in a No. 7 gateway signaling network, which can perform a mapping function for different translation types.

2. Background of the Related Art

In general, an intelligent network service stores service information regarding subscribers in a central mass data base and searches the data base when service is requested by the subscriber. Thus, various services for the subscriber can be provided based on the information stored in the data base. The intelligent network service typically includes free phone service through which a call terminating side bears telephone charges, as opposed to the call originating side. A credit call service is also provided, through which the telephone charges are paid with a credit card, and a virtual private network service is provided, through which each telecommunication terminal is defined as a service group, so as to provide such a communication service similar to using a private dedicated network.

To promote the service through the data base and protect the service from any signaling network fault, the signaling network is designed and managed to be double-structured. That is, it has another data base to store the same contents therein as in the main data base. As a result, if a fault is generated by the main data base, another data base operates manually.

The No. 7 gateway signaling network provides a certain service referred to as a global title translation service, wherein two data bases providing a single service are grouped into one. The thusly grouped databases have a single representative service number, and if a service request is made by a customer, the service request is connected to only one of the two data bases. This is possible since the connected data base is available based on the signaling network condition.

The representative service number for uniquely classifying the respective services is needed to provide the global title translation service. Global title translation is a procedure of determining a destination signaling point based on information in the signaling message. The translation type is a kind of code identifying information relating to the global title translation, i.e., a storage type of the global title in a signal message, a method for interpreting the global title, a number system of the global title, a method for translating the global title, etc.

The above mentioned translation type is a code in a range of 0 to 255. Each network provider can assign the translation type according to each service and determine the method for assigning the translation type as well. Thus, the respective network providers have each developed individual methods for providing services and individual methods of assigning the translation types, depending on the services.

However, to be interworked, network providers using different networks from each other must use the same translation type with respect to a service. For example, the same translation type must be used by all of the network providers in order to provide a signaling connection control part (SCCP) service with the global title translation. If the network providers employ different translation types, a novel translation type for the interworking service should be made. Then, the existing translation type and the additional translation type for the interworking service would have to be simultaneously managed. Otherwise, one of the network providers necessarily changes the existing signaling network to modify local translation type into the translation type used by other (non-local) network providers.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide a system and method for mapping a translation type in a No. 7 signaling network that substantially obviates problems due to limitations in the related art.

It is another object of the present invention to provide a method for mapping a translation type in a No. 7 gateway signaling network that can provide an interworking operation of a signaling connection control part (SCCP) service without modifying a signaling network, suspending service, or requiring a novel definition of a translation type.

It is another object of the present invention to provide a method for mapping a translation type in a No. 7 gateway signaling network, which configures and then searches a translation type mapping table to perform a translation type mapping function between a plurality of network providers employing different translation types.

To achieve at least these objects in whole or in parts, there is provided a method for performing translation type mapping in the No. 7 gateway signaling network, comprising defining translation type information on non-local (other) signaling networks in the translation type mapping table upon receiving a manager's request; mapping a translation type of the non-local signaling network contained in a SCCP message received from the neighbor (adjacent) non-local signaling network into a translation type of a local (self) signaling network by searching the translation type mapping table; and mapping the translation type of the local signaling network contained in the SCCP message transmitted to the adjacent non-local signaling network into the translation type of the non-local signaling network by searching the translation type mapping table.

In a preferred embodiment, the translation type mapping table includes a receiving translation type table configured to search the translation type of the local signaling network with translation types of an originating signaling network transmitting the SCCP message and of the non-local signaling network contained in the SCCP message; and a transmitting translation type table configured to search a translation type of a terminating signaling network with translation types of the terminating signaling network receiving the SCCP message and of the local signaling network contained in the SCCP message.

In a preferred embodiment, the translation type mapping definition step comprises receiving the translation type mapping information according to a request of defining the translation type mapping as for the non-local signaling network; storing the translation type mapping information in the translation type mapping table, if the local signaling network is defined as the gateway signaling network, the translation type used by the non-local signaling network is defined in the SCCP signaling network, and the non-local signaling network is defined in the gateway signaling network; and transferring the translation type mapping information to a processor, which actually performs the translation type mapping, and reporting the result of the translation type mapping definition.

In a preferred embodiment, the translation type mapping information includes the translation type information on the local signaling network, the information related to the non-local signaling network as a mapping object, and the translation type information on the non-local signaling network.

In a preferred embodiment, the receiving translation type mapping step with respect to the received SCCP message comprises searching the originating signaling network transmitting the SCCP message if received the SCCP message from a signal link interworked with the adjacent (neighbor) non-local signaling network, while searching the translation type of the non-local signaling network contained in the SCCP message if the originating signaling network is the non-local signaling network; determining whether or not the translation type of the local signaling network corresponding to the translation type of the non-local signaling network exists by searching the receiving translation type mapping table with the searched translation type of the non-local signaling network; and if it exists, mapping the translation type of the non-local signaling network contained in the SCCP message into the translation type of the local signaling network.

In a preferred embodiment, the transmitting translation type mapping step with respect to the transmitted SCCP message comprises searching the translation type of the self (local) signaling network contained in the SCCP message to be transmitted if the terminating signaling network is the other (non-local) signaling network; determining whether or not the translation type of the non-local signaling network corresponding to the translation type of the local signaling network exists by searching the transmitting translation type mapping table with the searched translation type of the local signaling network; and if it exists, mapping the translation type of the local signaling network contained in the SCCP message to be transmitted into the translation type used by the terminating signaling network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the present invention will be described herein below with reference to the accompanying drawings. In the following description, well-known functions or constructions are not described in detail.

A method for performing a translation type mapping according to a preferred embodiment of the present invention includes defining translation type information for a non-local signaling network in a translation type mapping table according to a request by a manager. The translation type mapping table is searched with a translation type used by the non-local signaling network contained in a signaling connection control part (SCCP) message received from the adjacent non-local signaling network. Then, the translation type used by the non-local signaling network is mapped into a translation type used by the local signaling network, and the translation type mapping table is searched with the translation type used by the local signaling network contained in the SCCP message to be transmitted to the adjacent non-local signaling network. Finally, the translation type of the local signaling network is mapped into the translation type of the non-local signaling network.

Figure 1:
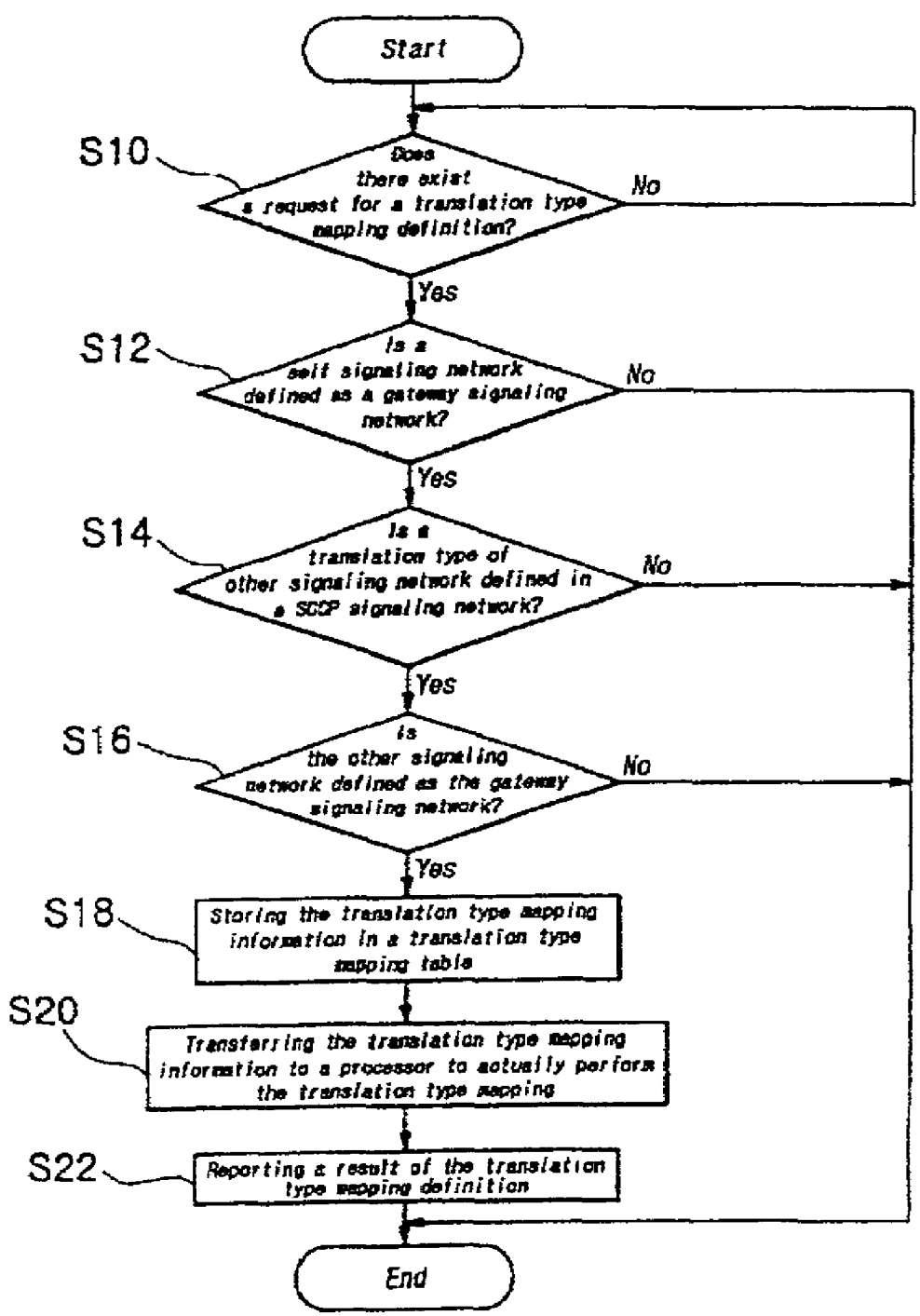
FIG. 1 is a flow chart illustrating a translation type mapping definition process according to a preferred embodiment of the present invention.

FIG. 1 is a diagram illustrating the translation type mapping definition process in the method for performing the translation type mapping according to a preferred embodiment. First, if an instruction for the translation type mapping is received, it is determined whether or not there is a request that the translation type information on the non-local signaling network be defined in the translation type mapping table (step S10). If it is so requested in step S10, the translation type number information used by the local system is received along with information related to the non-local signaling network to be mapped, and the translation type number information used by the non-local signaling network. These will be parameters of the instruction.

Next if the definition is requested in step S10, it is determined whether or not the local signaling network is defined as a gateway signaling network (step S12). If the local signaling network is so defined, it is determined whether or not the translation type used by the non-local signaling network inputted in step S10 is defined in the SCCP signaling network (step S14). If it is defined in step S14, it is next determined whether or not the non-local signaling network is defined in the gateway signaling network (step S16).

If it is defined in step S16, the translation type mapping information inputted in step S10 is stored in the translation type mapping table. That is, the translation type number information used by the local signaling network, the information related to the non-local signaling network to be mapped, and the translation type number information used by the non-local signaling network are stored (step S18). The translation type mapping information is then transferred to a processor, which actually performs the translation type mapping function (step S20). The result of the translation type mapping definition is then preferably reported to the manager (step S22).

The aforementioned translation type mapping table is preferably classified into a receiving translation type mapping table with respect to the received SCCP message, and a transmitting translation type mapping table with respect to the transmitted SCCP message in terms of its function.

The receiving translation type mapping table is configured to be capable of searching the translation type in which the translation type used by the signaling network (an originating signaling network) adjacent to a signal link receiving the SCCP message and by the non-local signaling network contained in the received SCCP message is used a key value in the local signaling network.

```
Struct RxTxMap{ /* receiving TT Mapping table */
Unsigned short OwnNetTt; /* TT of a pertinent self signaling network */
}
ReceiveTtMappingTable [originating signaling network][TT of the
originating signaling network provider] = TT of the self signaling network
```

The transmitting translation type mapping table is configured to be capable of searching the translation type in which the translation type used by the signaling network (a terminating signaling network) adjacent to a signal link transmitting the SCCP message and by the local signaling network contained in the transmitted SCCP message is used a key value in the terminating signaling network.

```
Struct RxTxMap{ /* transmitting TT Mapping table */
Unsigned short DpNetTt; /* TT of a pertinent terminating signaling
network */
}
TransmitTtMappingTable [terminating signaling network][TT of the self
signaling network] = TT of the terminating signaling network
```

As described above, after completing the translation type mapping definition process, in which the translation type information on the non-local signaling network is defined in the translation type mapping table, the translation type used by the non-local signaling network contained in the SCCP message received by the non-local signaling network with the translation type mapping table is mapped into the translation type of the local signaling network.

Figure 2:
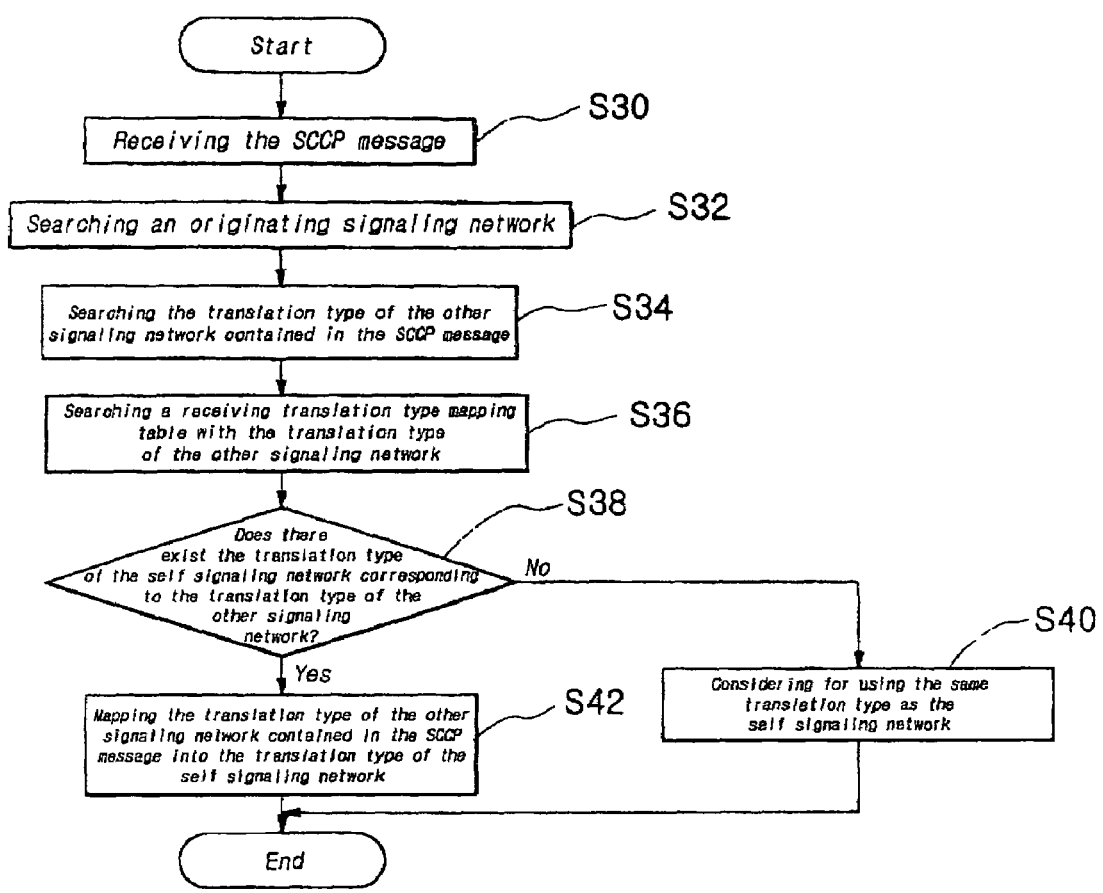
FIG. 2 is a flow chart illustrating a receiving translation type mapping process according to the preferred embodiment of the present invention.

FIG. 2 is a diagram illustrating the receiving translation type mapping process in the method for mapping the translation type mapping according to the preferred embodiment.

If the SCCP message is received from the signal line interworked with the adjacent non-local signaling network (step S30), it is determined whether or not the originating signaling network is the local signaling network. This is done by searching a signaling network adjacent to a signal link set of the gateway receiving the SCCP message (step S32).

If the originating signaling network is determined to be the non-local signaling network in step S32, the translation type of the non-local signaling network contained in the received SCCP message is searched (step S34). It is then determined whether or not the translation type of the local signaling network corresponding to the translation type of the non-local signaling network exists by searching the receiving translation type mapping table (steps S36, S38) with the translation type of the non-local signaling network searched in step S34. If it is determined that it does not exist in step S38, the translation type of the non-local signaling network is considered to be the same as that of the local signaling network (step S40). If it is determined to exist in step S38, the translation type of the non-local signaling network contained in the received SCCP message is mapped into the translation type of the local signaling network (step S42).

In the meantime, after completing the translation type mapping definition process in which the translation type information on the non-local signaling network is defined in the translation type mapping table, the transmitting translation type mapping is performed, whereby the translation type of the local signaling network contained in the SCCP message to be received from the non-local signaling network with the translation type mapping table is mapped into the translation type of the non-local signaling network.

Figure 3:
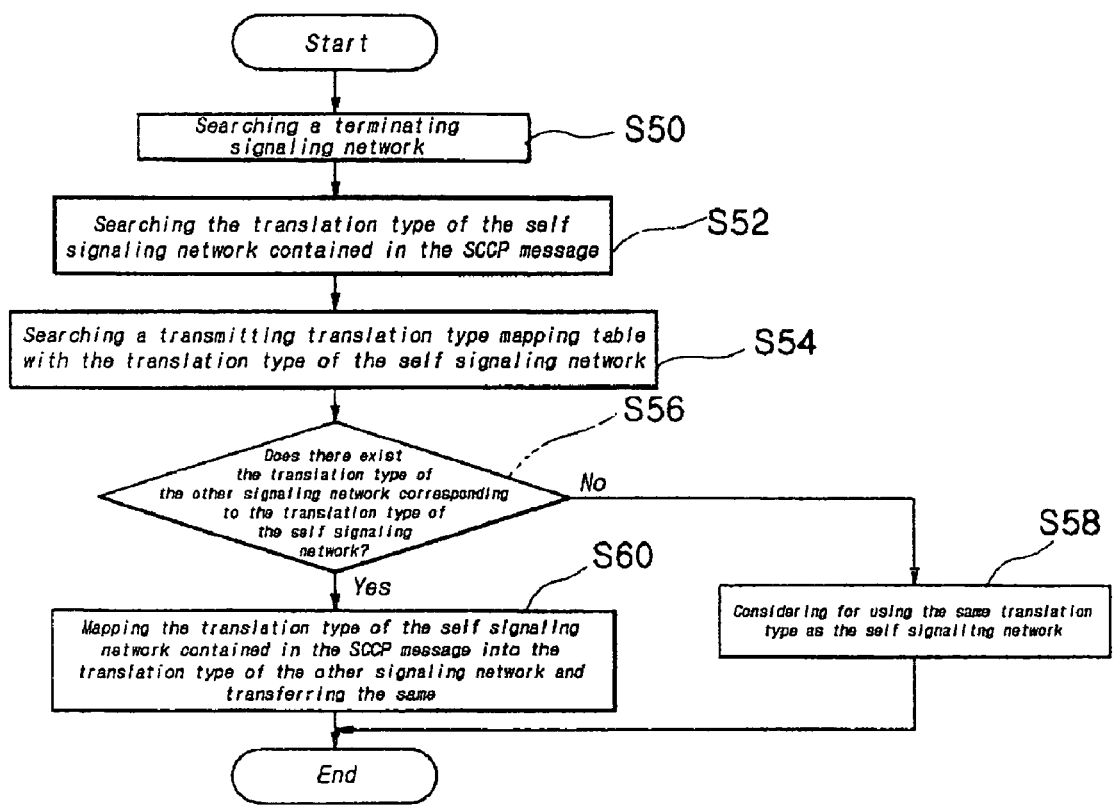
FIG. 3 is a flow chart illustrating a transmitting translation type mapping process according to the preferred embodiment of the present invention.

FIG. 3 is a diagram illustrating the transmitting translation type mapping process in the method for performing the translation type mapping according to the preferred embodiment.

First, it is determined whether the terminating signaling network is the local signaling network in order to transmit the SCCP message to the signal link interworked with the adjacent non-local signaling network (step S50). This is done by searching the signaling network adjacent to the gateway signal link set transmitting the SCCP message.

If the terminating signaling network is not the local signaling network, but rather the non-local signaling network in step S50, it is searched the translation type used by the local signaling network contained in the SCCP message to be transmitted (S52). It is determined whether or not the translation type of the non-local signaling network corresponding to the translation type of the local signaling network exists by searching the transmitting translation type mapping table (steps S54, S56) with the translation type used by the local signaling network searched in step S52. If it is determined that it does not exist in step S56, the translation type of the non-local signaling network is considered to be the same as the translation type of the local signaling network (step S58). Alternatively, if it is determined to exist in step S56, the translation type of the local signaling network contained in the SCCP message to be transmitted is mapped into the translation type used by the terminating signaling network (step S60).

Figure 4:
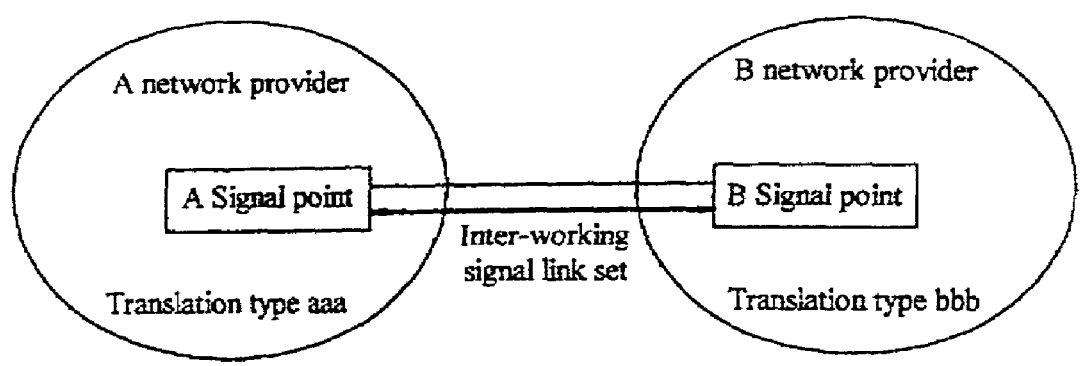
FIG. 4 is a diagram illustrating a configuration of a No. 7 gateway signaling network employing the process for mapping the translation type according to the preferred embodiment of the present invention.

For example, as shown in FIG. 4, if the SCCP message is received from the signal link interworked with the signaling network of network provider B adjacent to the signaling network of network provider A, signaling network B adjacent to the signal link receiving the SCCP message is searched. The translation type bbb of signaling network B contained in the SCCP message is also searched, as is the receiving translation type mapping table with the translation type bbb of signaling network B. Thus the mapping into the translation type aaa of the local signaling network corresponding to the translation type bbb of the signaling network of the B network provider is performed.

In the meantime, if the SCCP message is transmitted to the signal link interworked with the signaling network of network provider B adjacent to the signaling network of network provider A, the signaling network of network provider B adjacent to the signal link to transmit the SCCP message is searched. The translation type aaa of the signaling network of network provider A contained in the SCCP message is also searched, as is the transmitting translation type mapping table with the translation type aaa of the signaling network of network provider A. Thus the mapping into the translation type bbb of the terminating signaling network corresponding to the translation type aaa of the signaling network of network provider A is performed.

As stated above, according to the present invention, the method for performing the translation type mapping in the No. 7 gateway signaling network can perform the mapping with respect to the different translation types when the plurality of network providers interwork to provide the SCCP service in the No. 7 gateway signaling network, thereby providing the interworking SCCP service without a modification of a signaling network, a suspension of a service and a novel definition of a translation type.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for mapping a translation type in a No. 7 gateway signaling network, comprising:
    defining translation type information of a first signaling network in a translation type mapping table;
    mapping a translation type contained in a signaling connection control part (SCCP) message of the first signaling network received from an adjacent signaling network into a translation type of a second network by searching the translation type mapping table;
    mapping a translation type of the second signaling network contained in a SCCP message to be transmitted to the adjacent signaling network into the translation type of the first signaling network by searching the translation type mapping table; and
    inserting the mapped translation type into a same field of a protocol used to communicate between the first and second signaling networks such that a structure of the protocol is not changed.

2. The method of claim 1, wherein the translation type mapping table comprises a receiving translation type table configured to resolve the translation type of the second signaling network with at least one of a translation type of an originating signaling network transmitting the SCCP message and the translation type of the first signaling network contained in the SCCP message.

3. The method of claim 1, wherein the translation type mapping table comprises a transmitting translation type table configured to resolve a translation type of a terminating signaling network with at least one of a translation type of the terminating signaling network to receive the SCCP message and the translation type of the second signaling network contained in the SCCP message.

4. The method of claim 1, wherein defining the translation type information comprises:
    receiving translation type mapping information according to a request to define a translation type mapping for the first signaling network;
    storing the translation type mapping information in the translation type mapping table; and
    transferring the translation type mapping information to a processor to perform a translation type mapping function.

5. The method of claim 4, wherein if the second signaling network is defined as a gateway signaling network, the translation type used by the first signaling network is defined in a SCCP signaling network, and the first signaling network is defined in the signaling network of the gateway.

6. The method of claim 4, wherein the translation type mapping information comprises the second signaling network translation type information.

7. The method of claim 4, wherein the translation type mapping information comprises information related to the first signaling network as a mapping object.

8. The method of claim 4, wherein the translation type mapping information comprises the translation type information of the first signaling network as a mapping object.

9. The method of claim 1, wherein mapping the translation type of the message received from the first network comprises:
    searching an originating signaling network transmitting the SCCP message if the SCCP message is received from a signal link interworked with the adjacent signaling network, and searching the translation type contained in the SCCP message of the first signaling network if the originating signaling network is the first signaling network;
    determining whether the translation type of the second signaling network corresponding to the translation type of the first signaling network exists by searching the receiving translation type mapping table with the resolved translation type of the first signaling network; and
    mapping the translation type of the first signaling network contained in the SCCP message into the translation type of the second signaling network, if the translation type of the second signaling network corresponding to the translation type of the first signaling network exists.

10. The method of claim 1, wherein mapping the translation type of the message to be transmitted comprises:
    searching the translation type of the second signaling network contained in the SCCP message to be transmitted if a terminating signaling network is the first signaling network;
    determining whether the translation type of the first signaling network corresponding to the translation type of the second signaling network exists by searching the transmitting translation type mapping table with a resolved translation type of the second signaling network; and
    mapping the translation type of the second signaling network contained in the SCCP message to be transmitted into the translation type used by the terminating network, if the translation type of the first signaling network corresponding to the translation type of the second signaling network exists.

11. A method of transmitting a signaling connection control part (SCCP) message from a first network to a second network, comprising:
    generating a first SCCP signal having a first translation type;
    transmitting the first SCCP signal from a first network;
    searching a translation type mapping table for a definition corresponding to the first translation type;
    receiving the first SCCP signal by a second network having a second translation type;
    mapping the first translation type to the second translation type according to the definition from the translation type mapping table; and
    inserting the mapped second translation type into a same octet as the first translational type of a protocol used to communicate between the first and second networks.

12. A method of mapping a translation type in a common channel signaling network, comprising:
    identifying a first translation type of a first network based on a signaling connection control part (SCCP) message;
    searching a look-up table for a second translation type of a second network corresponding to the first translation type;

mapping the first translation type to the second translation type in accordance with a definition of the look-up table; and wherein the first and second networks use the same protocol structure to communicate with each other and the mapped second translation type is placed in a same position of the protocol as the first translation type.

13. The method of claim 12, wherein the look-up table comprises one of a receiving translation type mapping table and a transmitting translation type mapping table.

14. The method of claim 13, wherein the transmitting translation type mapping table is configured to resolve a translation type of a terminating signaling network with at least one of a translation type of the terminating signaling network to receive the SCCP message and the translation type of the second network contained in the SCCP message.

15. The method of claim 13, wherein the receiving translation type mapping table is configured to resolve the translation type of the second network with at least one of a translation type of an originating signaling network transmitting the SCCP message and the translation type of the first signaling network contained in the SCCP message.

* * * * *